(12) United States Patent
Luppi

(10) Patent No.: US 9,399,847 B2
(45) Date of Patent: Jul. 26, 2016

(54) METHOD FOR INSTALLING A SELF-SUPPORTING TOWER FOR EXTRACTING HYDROCARBONS

(71) Applicant: Technip France, Courbevoie (FR)

(72) Inventor: Ange Luppi, Nîmes (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/351,592

(22) PCT Filed: Oct. 19, 2012

(86) PCT No.: PCT/FR2012/052391
§ 371 (c)(1),
(2) Date: Apr. 14, 2014

(87) PCT Pub. No.: WO2013/057445
PCT Pub. Date: Apr. 25, 2013

(65) Prior Publication Data
US 2014/0314493 A1 Oct. 23, 2014

(30) Foreign Application Priority Data
Oct. 21, 2011 (FR) ...................................... 11 59566

(51) Int. Cl.
*F16L 1/15* (2006.01)
*F16L 1/24* (2006.01)
*E21B 43/013* (2006.01)
*E02B 17/02* (2006.01)
(Continued)

(52) U.S. Cl.
CPC ................. *E02B 17/02* (2013.01); *B63B 27/02* (2013.01); *E21B 17/012* (2013.01); *E21B 43/0135* (2013.01); *F16L 1/15* (2013.01); *F16L 1/24* (2013.01)

(58) Field of Classification Search
CPC ................. F16L 1/12; F16L 1/14; F16L 1/15; E21B 43/0135; E21B 43/0107
USPC .................................. 405/158, 171, 172, 224
See application file for complete search history.

(56) References Cited

U.S. PATENT DOCUMENTS 4,063,430 A * 12/1977 Lamy ............................ 405/171
4,075,862 A * 2/1978 Ames ............................ 405/169
4,271,550 A * 6/1981 Joubert et al. ................ 441/133

(Continued)

FOREIGN PATENT DOCUMENTS

FR 2 768 457 3/1999
GB 2475108 5/2011

OTHER PUBLICATIONS

International Search Report dated Dec. 21, 2012 issued in corresponding International patent application No. PCT/FR2012/052391.

*Primary Examiner* — Tara M. Pinnock
(74) *Attorney, Agent, or Firm* — Ostrolenk Faber LLP

(57) ABSTRACT

A method for installing a self-supporting tower at a sea bed. An anchoring mechanism (32) is installed on the bed. A float (18) and a tubular pipe (68) are submerged and then driven towards the bed (12) to attach to one of the ends (72) of the anchoring mechanism (32), while the float (18) is fastened to the other (70) of the ends keeping the pipe (68) vertical above the anchoring mechanism (32). The tubular pipe (68) and the float (18) are supplied separately. The float (18) is kept submerged at a distance away from the anchoring mechanism (32). The tubular pipe (68) is suspended from the float via the other (70) of the ends of the pipe.

10 Claims, 5 Drawing Sheets

(51) Int. Cl.
    *E21B 17/01*     (2006.01)
    *B63B 27/00*     (2006.01)

(56) References Cited

U.S. PATENT DOCUMENTS

| | | | |
|---|---|---|---|
| 4,423,984 A | 1/1984 | Panicker et al. | |
| 6,321,844 B1 * | 11/2001 | Thiebaud et al. | 166/345 |
| 6,811,355 B2 * | 11/2004 | Poldervaart | 405/169 |
| 8,282,315 B2 * | 10/2012 | Espinasse et al. | 405/171 |
| 8,734,055 B2 * | 5/2014 | Remery et al. | 405/171 |
| 8,882,390 B2 * | 11/2014 | Remery et al. | 405/171 |
| 2003/0123936 A1 * | 7/2003 | Karal et al. | 405/223.1 |
| 2005/0109513 A1 | 5/2005 | Dailey et al. | |
| 2008/0056826 A1 * | 3/2008 | Luppi | 405/171 |

\* cited by examiner

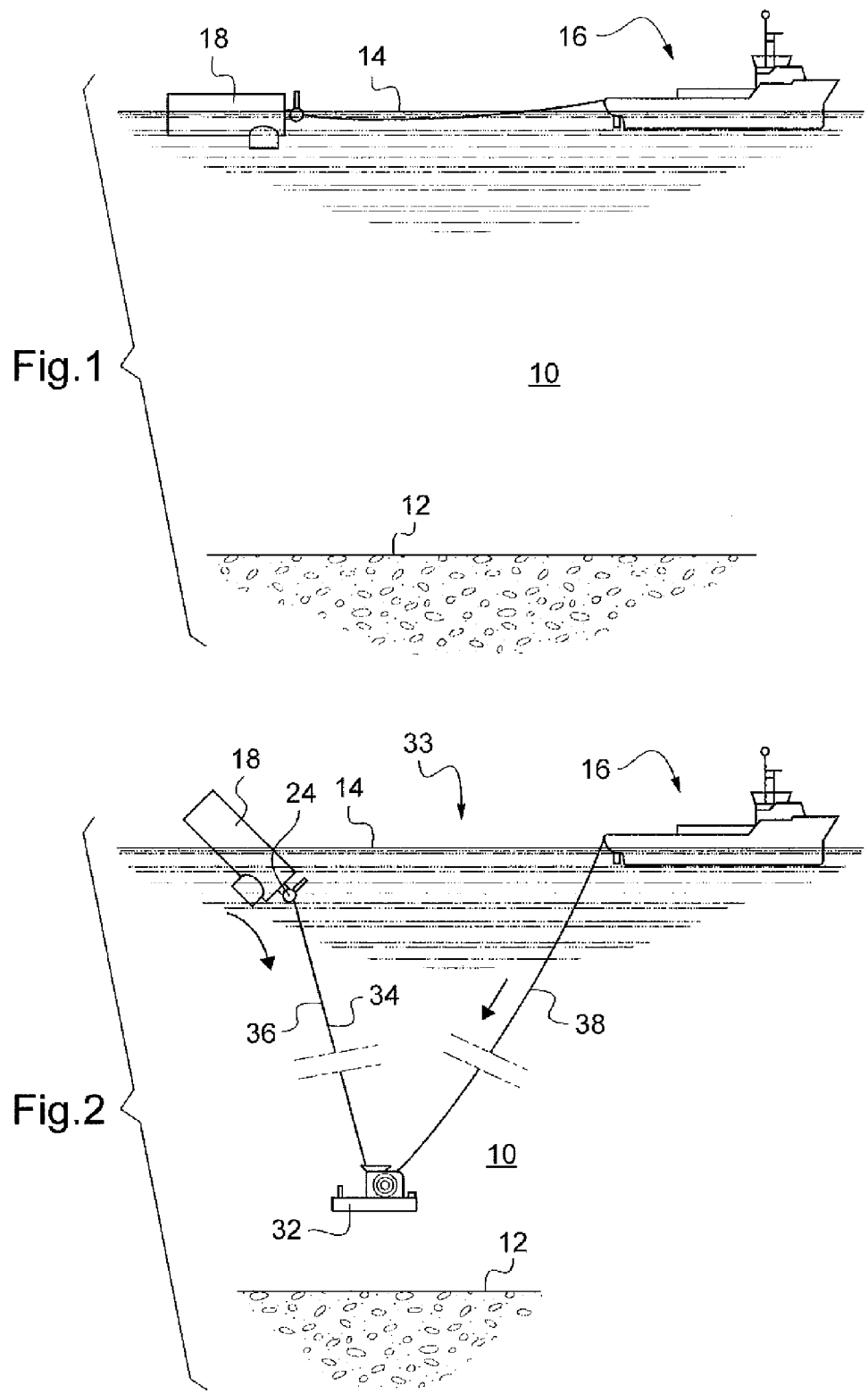

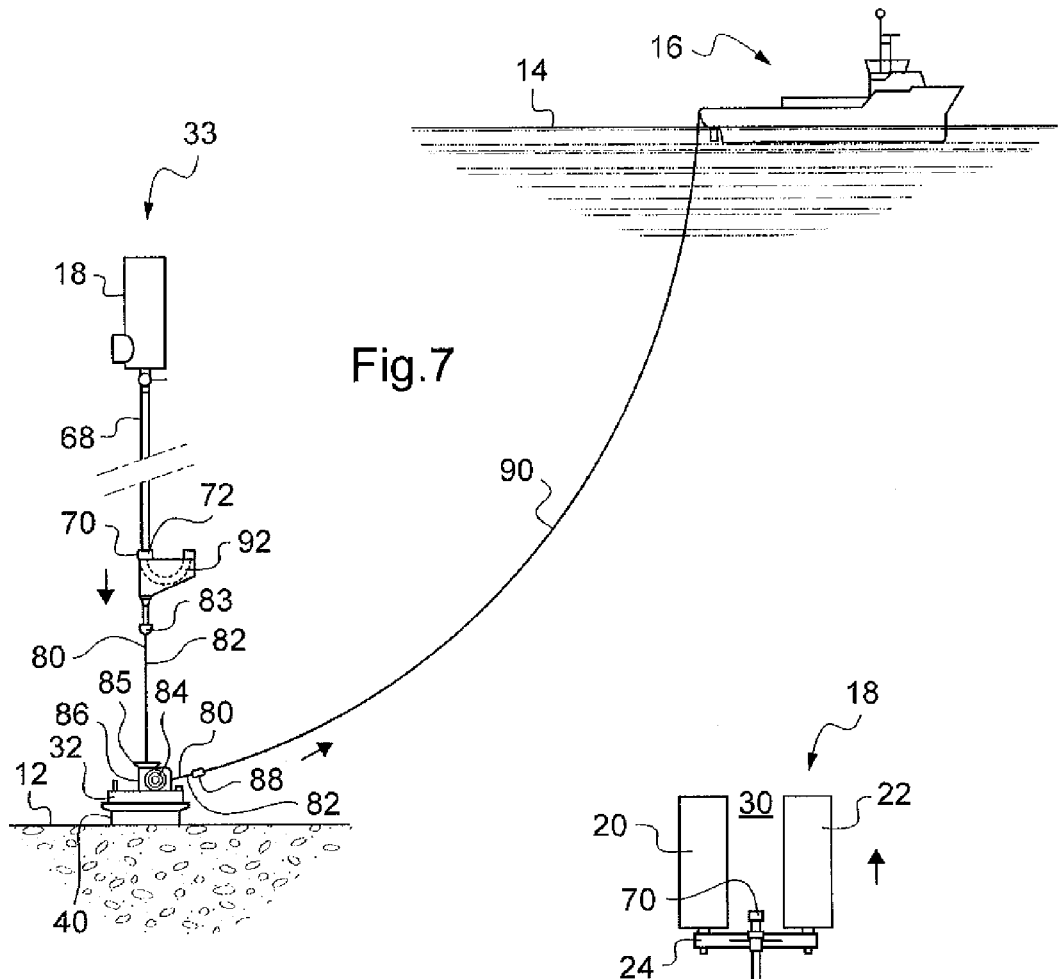

METHOD FOR INSTALLING A SELF-SUPPORTING TOWER FOR EXTRACTING HYDROCARBONS

CROSS-REFERENCE TO RELATED APPLICATIONS

The present application is a 35 U.S.C. §§371 national phase conversion of PCT/FR2012/052391, filed Oct. 19, 2012, which claims priority of French Application No. 1159566, filed Oct. 21, 2011, the contents of which are incorporated by reference herein. The PCT International Application was published in the French language.

BACKGROUND OF THE INVENTION

The present invention relates to a method for installing a self-supporting tower for the extraction of hydrocarbons from a marine environment and to a tower thus installed.

The method seeks in particular to install self-supporting towers in very deep marine environments in order to extract the hydrocarbons present in the sea bed subsoil, and more specifically to raise these hydrocarbons from the sea bed to the surface.

Such self-supporting towers entail the use of long and also large diameter tubular pipes and, therefore, of bulky floats to keep them suspended vertically in the marine environment. To do this, an anchorage installation is first of all installed in the sea bed above the hydrocarbon-rich subsoil, then the float and the pipe are towed out on the surface by a ship to an installation zone situated substantially in line with the anchorage installation. The pipe is generally filled with air to improve its buoyancy and make it easier to transport, and is coupled to the float by one end so that the whole entity can be towed. Next, the pipe alone is progressively submerged while the float remains lying down on the surface. Also, the pipe is connected to the float by means of pivot members in order to allow the pipe to pivot from a horizontal position into a substantially vertical position. The free end of the pipe is then connected to a hauling line which is first stretched as far as the anchorage installation where it is engaged through return means then stretched back up to a surface ship. The surface ship then moves away from the installation zone causing the free end of the pipe to be made to move toward the anchorage installation. As a result, the float tips, pivoting about the end of the pipe as it gradually submerges. Also, the nearer the free end comes to the anchorage installation, the more the float becomes submerged. After the free end of the pipe has been coupled to the anchorage installation, the float applies an upthrust toward the surface, keeping the tubular pipe rising vertically from the anchorage installation.

Reference may be made to document FR 2 768 457 which describes such a method of installing a self-supporting tower.

However, as the depth of the marine subsoils exploited is becoming increasingly great, the risers and floats are respectively longer and bulkier and, as a result, the methods of installing the self-supporting towers are becoming increasingly complex.

SUMMARY OF THE INVENTION

Hence, one problem that arises and that the present invention seeks to overcome is that of providing a method of installing a self-supporting tower in a marine environment which is simpler and therefore less expensive. The invention also seeks to provide a self-supporting tower obtained according to the method of installation that forms the subject matter of the invention.

To this end, the present invention proposes, according to a first subject, a method of installing a self-supporting tower for the extraction of hydrocarbons in a marine environment, said marine environment having a surface opposite to a bed. The method comprises: first of all an anchorage installation is provided and said anchorage installation is installed on said bed. Then a float and a tubular pipe having two opposite ends are provided. Then in an immersion step, said float and said tubular pipe are immersed in line with said anchorage installation. Said float and said tubular pipe are then made to move toward said bed so that one of said ends of said tubular pipe can be attached to said anchorage installation while said float is secured to the other of said ends in order to keep said pipe vertical in said marine environment starting from said anchorage installation. According to the invention, said tubular pipe and said float are provided separately. Said immersion step comprises, in order, the following substeps: first of all said float is kept immersed some distance away from said anchorage installation; and said tubular pipe is next suspended from said float via said other of said ends before said float and the tubular pipe are made to move toward said bed.

Thus, one feature of the invention lies in the use of the float and of the tubular pipe separately in a first phase of the installation. They are first of all transported to the installation zone independently of one another because the towing means are no longer able to tow both the float and the pipe together given their increasingly large dimensions. The float then floats in a horizontal position on the surface in the installation zone. It is submerged and tilted into a vertical position. It is held under the surface, preferably below the zone of turbulence, and some distance away from the anchorage installation. It is not until afterwards that the tubular pipe is then suspended from the float before the whole entity is made to move toward the sea bed. In that way, there is absolutely no need to provide means of pivoting the end of the tubular pipe with respect to the float because the float is already in a vertical position when the time comes to suspend the tubular pipe from it. Furthermore, making the tubular pipe and the float move independently of one another requires ordinary lifting gear of modest capacity.

Furthermore, a flexible pipe is provided and said flexible pipe is stretched between said float and said surface in order to couple said flexible pipe to said other of said ends of said tubular pipe. In this way, the hydrocarbon is raised as far as the float and then transported to the surface, into a reservoir, thanks to the flexible pipe.

According to one particularly advantageous embodiment, a rigid tubular pipe is provided which may either be towed out in a single piece to the installation zone or alternatively manufactured in situ on an appropriate laying vessel.

According to one preferred embodiment of the invention, said other of said ends, able to be suspended from the float, has a bulge, whereas said float comprises an attachment yoke, and said tubular pipe is engaged laterally through said attachment yoke so that said bulge can be made to press against said yoke. Also, said tubular pipe is preferably held from said surface by said other of said ends so that said other of said ends can be engaged through said yoke. To do that, the tubular pipe is kept suspended from a sling from the surface vessel and the vessel is brought close to the installation zone so that the tubular pipe can be engaged laterally through the attachment yoke. Next, the sling is paid out so as to lower the tubular pipe and press its bulging end against the attachment yoke.

In addition, at least one anchorage line is advantageously provided for anchoring said float into said sea bed so as to be able to keep said float immersed some distance away from said anchorage installation. Two anchorage lines are preferably provided in order to stabilize the float better. Further, the anchorage lines are, for example, connected to the anchorage installation. Furthermore, said float is released from said at least one anchorage line when said one of said ends of said tubular pipe is attached to said anchorage installation. That way, the upthrust induced by the submerged float is reacted by the tubular pipe itself attached to the anchorage installation. Thus, the tubular pipe is held vertically from the anchorage installation.

Said float and said tubular pipe are advantageously made to move toward said bed by driving said one of said ends of said tubular pipe toward said anchorage installation. In this way, merely by hauling on the free end of the tubular pipe this end is moved closer to the anchorage installation, whereas the other end is suspended from the float. The hauling force applied to this free end has therefore to be greater than the upthrust induced by the float on the tubular pipe. For preference, a hauling cable is also provided and said hauling cable is connected to said one of said ends of said tubular pipe so that it is extended firstly through turn members mounted on said anchorage installation and secondly toward said surface so that said hauling cable can be hauled from said surface. In that way, the simple movement of a ship to which the hauling cable is connected, away from the installation zone, causes both the tubular pipe and the float to be moved toward the sea bed so that the free end of the tubular pipe can be attached to the anchorage installation.

Another object of the present invention is to propose a self-supporting tower for the extraction of hydrocarbons in a marine environment. Said marine environment has a surface opposite to a bed. Said bed has an anchorage installation. Said tower comprises firstly a float having two parts spaced apart and joined together by a connecting beam and secondly has a tubular pipe having two opposite ends. Said float is intended to be carried between said bed and said surface, whereas one of said ends of said pipe is attached to said anchorage installation and the other of said ends is secured to said connecting beam. According to the invention, said two spaced-apart parts and said connecting beam form a U-shaped float having an empty space between said parts. This empty space extends vertically, firstly above the beam as far as the upper end of the two float parts to open to the outside and secondly underneath the beam. Thus, thanks to the empty space situated between the two parts of the float, it becomes easier for the tubular pipe to approach and be guided from the surface ship.

What is more, said connecting beam has a through-recess opening firstly in a first direction into said empty space and on the opposite side of said empty space from said beam and secondly opening in a second direction perpendicular to said first direction, into a free approach space so as to form an attachment yoke. Thus, the suspended tubular pipe runs substantially parallel to said first direction and is made to move laterally, in the perpendicular direction across the empty approach space so that it can then be released in said first direction through the through-recess.

In addition, said other of said ends of said rigid tubular pipe has a bulge able to be held inside said empty space to engage with said attachment yoke and in such a way that said tubular pipe can be suspended from said float. Whereas the tubular pipe is released vertically through the through-recess, the bulge comes to press against the beam around the through-recess. In that way, the tubular pipe is suspended from the float via the beam.

Other particulars and advantages of the invention will become apparent from reading the description given hereinafter of one particular embodiment of the invention, which is given by way of nonlimiting indication with reference to the attached drawings in which:

BRIEF DESCRIPTION OF THE DRAWINGS

FIG. 1 is a schematic view from the side depicting first elements for implementing the method of installing a self-supporting tower according to the invention, during a first approach phase;

FIG. 2 is a schematic view depicting a second phase of submerging one of the elements depicted in FIG. 1;

FIG. 7 is a schematic side view of the elements depicted in FIG. 6 in a fourth submerging phase;

FIG. 8 is a schematic front view of the elements depicted in FIG. 7 in a fifth submerging phase.

DESCRIPTION OF AN EMBODIMENT

Figure 3:
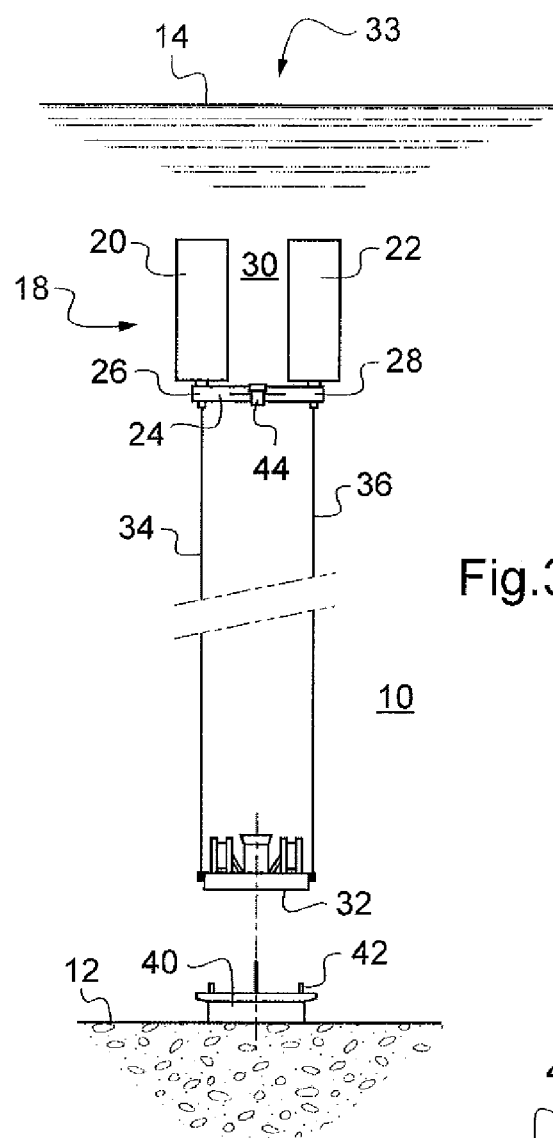
FIG. 3 is a schematic front view illustrating the element depicted in FIG. 2, in the second phase of submerging.

FIG. 1 illustrates a marine environment 10 which extends between a sea bed 12 and a surface 14. Sailing on this surface 14 is a ship 16 towing a float 18, itself floating on the surface 14. Thus, the ship 16 drives the float 18 toward an installation zone in line with a sea bed 12 from which a hydrocarbon is to be extracted.

Reference will be made to FIG. 3 to detail the float 18. It has two longitudinal cylindrical parts 20, 22 joined together by a transverse beam 24. The latter has two opposite ends 26, 28 secured respectively to the end of the longitudinal cylindrical parts 20, 22 of the float 18. Thus, the beam 24 keeps the two parts 20, 22 substantially parallel to and distant from one another, leaving an empty space 30 between them. Thus, the beam 24 and the two longitudinal cylindrical parts 20, 22 together form a U-shaped float 18.

It will be noted that the beam 24 is connected by two parallel cables 34, 36 installed respectively at each of its ends 26, 28, to a platform 32 that can be seen in side view in FIG. 2. Before completing the description of this FIG. 3, FIG. 2 will be described in greater detail as it shows a first step of submerging the float 18 in an installation zone 33.

The platform 32 is more dense overall than the marine environment and is connected firstly to the float 18 by the two parallel cables 34, 36 and secondly to the ship 16 by an anchor line 38, before being submerged. The anchor line constitutes the ballast for the float 18 and as the anchor line 38 is paid out it sinks deeper into the marine environment 10 toward the bed 12 and takes with it the float 18 which, at the surface, tilts into a vertical position. Of course, the platform 32 applies tension to the parallel cables 34, 36 which is greater than the weight of water volume corresponding to the volume of the float 18. The anchor line 38 guides the descent of the platform 32 toward the bed 12 and, therefore, the submerging of the float 18.

Reference is made again to FIG. 3 in which the platform 32 is lowered and the longitudinal cylindrical parts 20, 22 are submerged vertically.

Moreover, installed on the sea bed 12 is a base 40 that forms an anchorage installation and is able to accept the platform 32. This base 40 has guide studs 42 able to engage in orifices formed through the platform 32 and allowing it a perfect fit. After the platform 32 has been settled onto the base 40, it is locked to the latter in order to secure it thereto. Also, the anchor line 38 is disconnected and the float 18 is kept submerged some distance away from the anchorage installation, below the surface 14 and more particularly below the turbulent zone.

Figure 4:
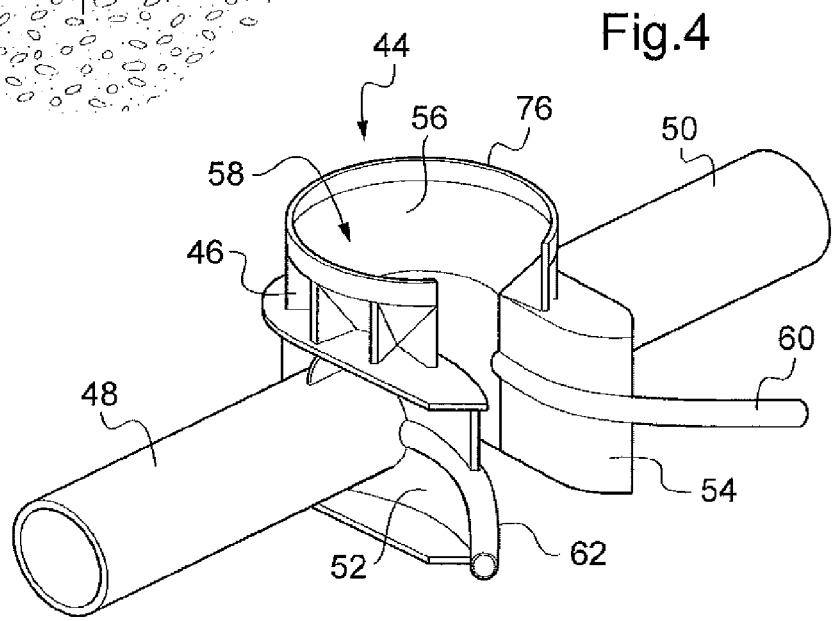
FIG. 4 is a schematic perspective view of a detail of the first element depicted in FIGS. 1 to 3.

It will be seen that the beam 24 has, between these two opposite ends 26, 28, an attachment member 44 that can be seen in greater detail in FIG. 4. This attachment member 44 comprises a yoke 46 and two coaxial sleeves 48, 50. The yoke 46 has two opposite wings 52, 54 and a bottom 56. The latter defines a cylindrical zone with a cylindrical base 58 and the two sleeves 48, 50 are mounted coaxially on each side of the two opposite wings 52, 54 respectively. Furthermore, the two opposite wings 52, 54 are respectively extended by guide pins 60, 62 which diverge from one another.

Thus, the attachment member 44 is installed via the beam 24 more or less equidistant from the two opposite ends 26, 28 so that the two coaxial sleeves 48, 50 extend longitudinally inside the beam 24 and so that the cylindrical zone on a circular base 58 of the yoke 46 passes through the beam 24 and opens, firstly in a vertical direction into the empty space 30 between the two parts 20, 22 of the float 18 and on the opposite side into the space situated under the beam 24, and secondly in a horizontal direction into an empty approach space extending between the two opposite wings 52, 54 then between the guide pins 60, 62. This empty approach space obviously extends substantially perpendicularly to the beam 24 and outside of this beam.

Figure 5:
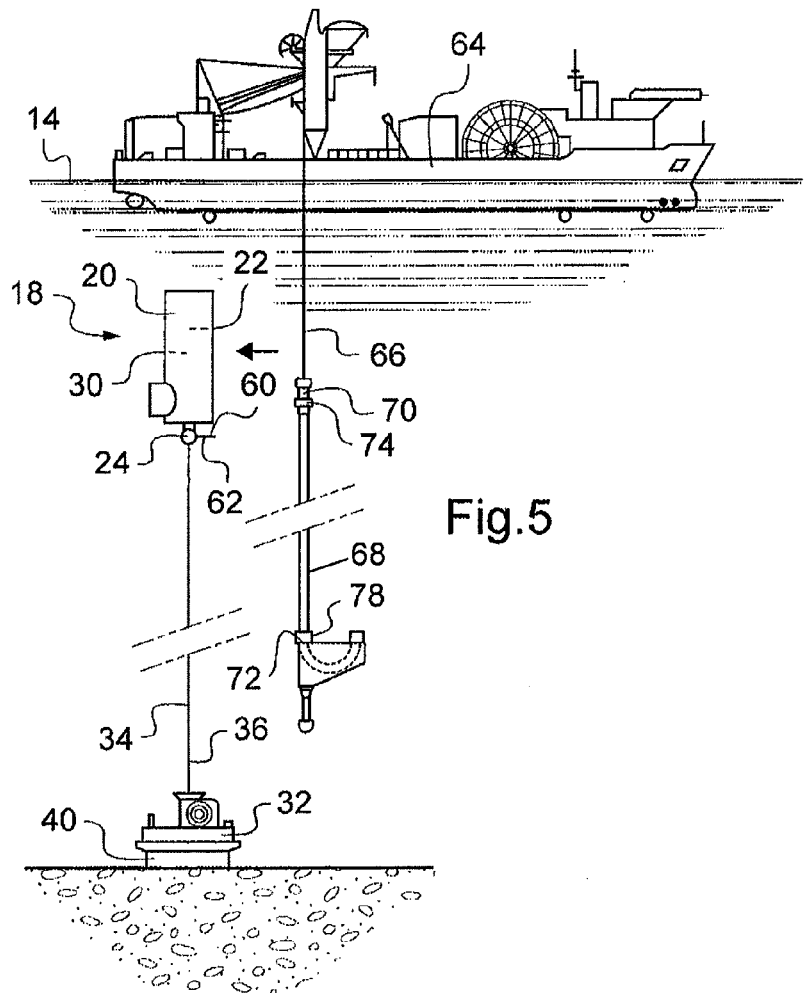
FIG. 5 is a schematic view depicting the implementation of another element during a third phase of submerging.

Reference will now be made to FIG. 5 which shows the float 18 held a distance from the anchorage installation formed by the base 40 associated with the platform 32. It also again shows, viewed along its axis, the beam 24 secured to the end of the parts 20, 22 of the float 18. Only the guide pins 60, 62 of the attachment member 44 are visible in this figure, projecting from the beam 24.

Furthermore, this figure illustrates a laying ship 64 that is holding a rigid tubular pipe 68, suspended from a sling 66. This pipe could have been produced directly on the laying vessel by assembling sections, or could alternatively have been produced on land and then coiled according to the techniques employed for coiling rigid pipe which will then be uncoiled in situ.

Figure 6:
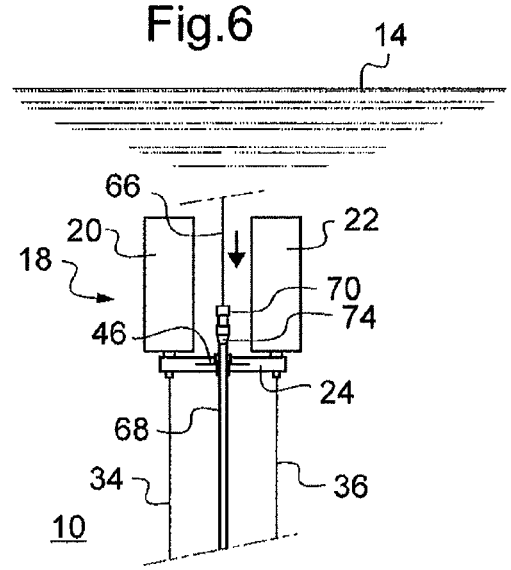
FIG. 6 is a schematic detailed view of the element depicted in FIG. 3 and of the other element depicted in FIG. 5, during the third, submerging, phase.

The rigid tubular pipe 68 has an upper end 70 to which the sling 66 is connected and a lower end 72. The upper end 70 also has a bulge 74 consisting of a frustoconical sleeve. Thus, the laying ship 64 will cause the rigid tubular pipe 68 to move toward the float 18, by bringing the tubular pipe 68 first between the guide pins 62, 60 whereas the upper end 70 and the bulge 74 engage on top of the beam 24 in the empty space 30 situated between the two parts 20, 22 of the float 18. The tubular pipe 68 then engages between the two wings 52, 54 of the yoke 46 then inside the cylindrical zone on a circular base 58, as illustrated from the front in FIG. 6.

Next, the sling 66 is released so that the frustoconical sleeve of the bulge 74 presses on the inside of the bottom 56 of the yoke 46. Quite obviously, the sleeve has a rim the diameter of which is greater than that of the cylindrical base 58 so that it bears against an edge 76 of the bottom 56 of the yoke 46. This edge 76 is depicted in FIG. 4. Thanks to the weight of the tubular pipe 68, the bulge 74 is trapped in the yoke 46. Thus, the upper end 70 of the tubular pipe 68 is secured to the float 18 via the beam 24.

The assembly consisting of the float 18 and the pipe 68 is then at equilibrium because the weight of the tubular pipe 68 is not enough to drag the float 18 toward the bed 12. Furthermore, the float 18 is still held by the two parallel cables 34, 36.

Also, the float 18 and the tubular pipe 68 will be driven toward the anchorage installation 32, 40 by driving down the lower end 72 of the rigid pipe 68. The lower end 72, which can be seen in FIG. 7, is therefore fitted with a first balance beam 78 having two opposite arms respectively secured to two hauling cables 80, 82 and with an automatic attachment head 83. The hauling cables 80, 82 are respectively engaged through two pulley wheels 84, 86 that form turn members and are installed on the platform 32 separated from one another. Installed between the two pulley wheels 84, 86 is a locking unit 85 intended to trap the locking head 83 of the lower end 72 of the tubular pipe 68 automatically.

Also, the two hauling cables 80, 82 are connected on the exit side of the pulley wheels 84, 86 to a second balance beam 88 itself connected to the ship 16 via a hauling line 90.

Thus, as it sails away from the installation zone 33, the ship 16 causes the hauling line 90 and, as a result, the second balance beam, to effect a translational movement in a direction away from the platform 32. As a result, the hauling cables 80, 82 are respectively driven through the pulley wheels 84, 86 and the first balance beam 78 is driven toward the platform 32 as is the lower end 72 of the tubular pipe 68. The locking head 83 then engages in the locking unit 85 and becomes trapped there automatically. Thus, the lower end 72 of the tubular pipe 68 is kept attached to the platform 32, itself a captive of the base 40. It is therefore fitted with a U-shaped coupling 92 so as to be able to couple the tubular pipe 68 to a well head or to an underwater buffer tank.

FIG. 8 thus illustrates the tubular pipe 68 held vertically in equilibrium by the float 18 applying an upthrust to its upper end 70 at the bulge 74. The tubular pipe 68 is referred to as a riser and with the float 18 forms a self-supporting tower. The parallel cables 34, 36 connecting the beam 24 to the platform 32 have been removed, as have the hauling cables 80, 82 of the balance beam 78.

Figure 9:
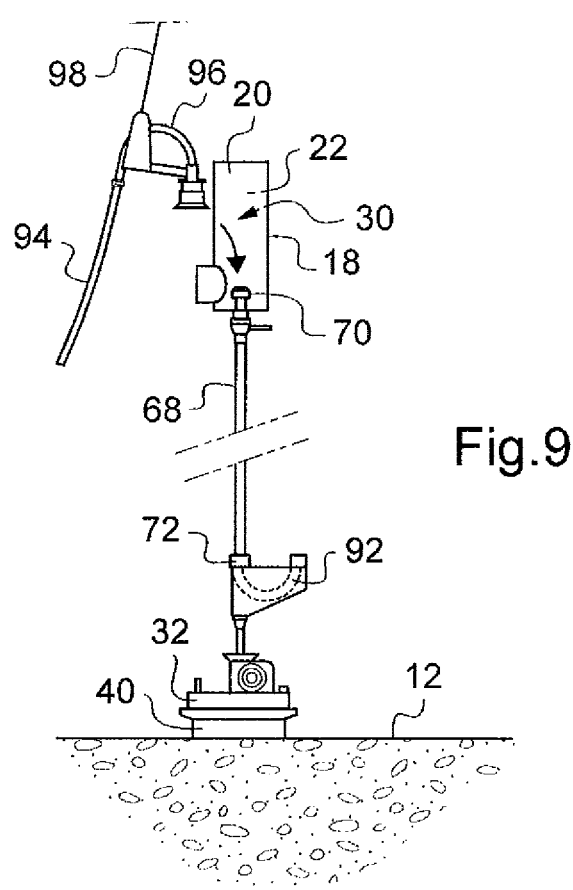
FIG. 9 is a schematic view of a self-supporting tower according to the invention according to a final phase of coupling.

In a final step, illustrated in FIG. 9, a flexible pipe 94 ending in a gooseneck coupling 96 is engaged through the empty space 30 situated between the two parts 20, 22 of the float 18 from the ship 16 by means of a positioning cable 98 so as to fit over the upper end 70 of the tubular pipe 68. This flexible pipe 94 then extends in a catenary curve between the float 18 and a surface installation including storage tanks.

The invention claimed is:

1. A method of installing a self-supporting tower for the extraction of hydrocarbons in a marine environment, wherein said marine environment has a surface opposite to a bed, said method comprising:
   installing an anchorage installation on said bed;
   providing a float, and providing a tubular pipe having two opposite ends;
   immersing said float and said tubular pipe in said marine environment in line with said anchorage installation; and
   moving said float and said tubular pipe toward said bed until and so that one of said ends of said tubular pipe can be attached to said anchorage installation while securing said float to the other of said ends of said pipe to keep said pipe vertical in said marine environment starting from said anchorage installation;

said immersing step comprising, in order, the following substeps:

immersing said float and maintaining said float immersed some distance away from said anchorage installation by at least one anchorage line attaching said float to said anchorage installation; and attaching said tubular pipe to said float via said other of said ends of said tubular pipe before said float and said tubular pipe are moved together toward said bed.

2. The method of installing as claimed in claim 1, further comprising extending a flexible pipe between said float and said surface for coupling said flexible pipe to said other of said ends of said tubular pipe.

3. The method of installing as claimed in claim 1, wherein said tubular pipe is rigid.

4. The method of installing as claimed in claim 1, wherein said other of said ends of said tubular pipe has a bulge, and said float comprises an attachment yoke;

the method further comprising engaging said tubular pipe laterally through said attachment yoke so that said bulge of said tubular pipe presses against said attachment yoke.

5. The method of installing as claimed in claim 4, further comprising holding said tubular pipe from said surface by said other of said ends of said tubular pipe and engaging said other of said ends of said tubular pipe through said attachment yoke.

6. The method of installing as claimed in claim 1, further comprising releasing said float from said at least one anchorage line when said one of said ends of said tubular pipe is attached to said anchorage installation.

7. The method of installing as claimed in claim 1, further comprising driving said one of said ends of said tubular pipe toward said anchorage installation to cause said float and said tubular pipe to move toward said bed.

8. The method of installing as claimed in claim 1, further comprising connecting a hauling cable to said one of said ends of said tubular pipe so that said hauling cable extends firstly through return members mounted on said anchorage installation and extends secondly toward said surface enabling hauling of said hauling cable from said surface.

9. The method of installing as claimed in claim 1, further comprising:

said float comprising two parts spaced apart and a connecting beam joining said two parts together to form a U-shape part of said float and define an empty space between said two parts of said float;

a yoke at said beam between connections of said connecting beam to each of said two parts of said float; and the method further comprising connecting said yoke at a location along said connecting beam away from said connections of said two parts of said float to said connecting beam.

10. The method of installing as claimed in claim 1, wherein said float comprises two parts spaced apart and a connecting beam joining said two parts together to form a U-shape part of said float and define an empty space between said two parts of said float.

\* \* \* \* \*